United States Patent [19]
Ramakrishnan

[11] Patent Number: 6,049,546
[45] Date of Patent: Apr. 11, 2000

[54] SYSTEM AND METHOD FOR PERFORMING SWITCHING IN MULTIPOINT-TO-MULTIPOINT MULTICASTING

[75] Inventor: Kadangode K. Ramakrishnan, Berkeley Heights, N.J.

[73] Assignee: AT&T Corporation, New York, N.Y.

[21] Appl. No.: 08/730,424

[22] Filed: Oct. 15, 1996

[51] Int. Cl.[7] .......................... H04L 12/28; H04L 12/56; H04L 12/54
[52] U.S. Cl. .......................... 370/412; 370/396; 370/429; 370/417
[58] Field of Search .................... 370/390, 389, 370/393, 394, 396, 397, 398, 399, 412, 413, 414, 415, 416, 417, 418, 422, 429, 432, 395, 392, 381

[56] References Cited

U.S. PATENT DOCUMENTS

| | | | |
|---|---|---|---|
| 4,623,996 | 10/1984 | McMillen | 370/412 |
| 5,301,192 | 8/1991 | Henrion | 370/398 |
| 5,367,520 | 11/1992 | Cordell | 370/414 |
| 5,418,781 | 8/1994 | Kaufman et al. | 370/429 |
| 5,434,855 | 10/1994 | Perlman et al. | 370/397 |
| 5,555,256 | 4/1995 | Calamvokis | 370/395 |
| 5,583,861 | 4/1994 | Holden | 370/412 |
| 5,602,841 | 3/1995 | Lebizay et al. | 370/413 |
| 5,689,506 | 1/1996 | Chiussi et al. | 370/412 |
| 5,742,597 | 3/1996 | Holt et al. | 370/390 |
| 5,844,887 | 11/1995 | Oren et al. | 370/395 |
| 5,850,395 | 7/1996 | Hauser et al. | 370/398 |

*Primary Examiner*—Chi H. Pham
*Assistant Examiner*—Steven Nguyen
*Attorney, Agent, or Firm*—Kenyon & Kenyon

[57] ABSTRACT

A method for utilizing buffered switches to perform multipoint-to-multipoint multicasting within a telecommunication network. A switching feature known as cut-through forwarding is implemented for output-buffered switches, shared-memory switches and input-buffered switches.

32 Claims, 4 Drawing Sheets

SYSTEM AND METHOD FOR PERFORMING SWITCHING IN MULTIPOINT-TO-MULTIPOINT MULTICASTING

FIELD OF INVENTION

The present invention relates to multicasting in communications networks. Specifically, this invention relates to a method and system for performing switching in multipoint-to-multipoint multicasting, communication networks.

BACKGROUND OF THE INVENTION

Point-to-point communication across a communication network among a single sender and a single receiver is well known and networking protocols for point-to-point communication services are well established. Increasingly, however, a communications arrangement needs to be established among multiple senders and/or multiple receivers constituting a group having some community of interest. Accordingly, the concept of a group multicast service has evolved for enabling multiple senders to communicate to multiple receivers.

Providing a point to multipoint connection is known in the art. Also several schemes exist for providing a multicast service between multiple senders and multiple receivers. These schemes, however, are not efficient, especially for ATM (Asynchronous Transfer Mode)connection oriented networks. Only a single known methodology efficiently provides a multicast service between multiple senders and multiple receivers: pending application Ser. No. 08/631,869 filed by Ramakrishnan et al. on Apr. 12, 1990 describes and claims a methodology, designated by the acronym SEAM (Scalable Efficient ATM Multicasting).

A brief overview of the SEAM methodology is presented here for convenience of reference. Although the SEAM methodology is described in the context of an ATM network, it should be recognized that the SEAM methodology will be applicable to the provision of multicasting service in other communication networks, particularly other packet and sub-packet networks.

As is well known, networks are a principal means of exchanging or transferring information (e.g., data, voice, text, video, etc.) among communications devices (i.e., devices for inputting and or outputting information such as computer terminals, multimedia workstations, fax machines, printers, servers, telephones, videophones, etc.) connected to the network(s). A network typically comprises switching nodes connected to each other, and to communication devices, by links. Each link is characterized by a link capacity which will generally be specified as a bandwidth or, equivalently, a transmission rate. When information is to be exchanged between two communications nodes/devices, a path is established within the network connecting the nodes (hereafter called the origination and destination nodes) with which those devices are associated. Such a communications path, or channel, between a specified origin and destination may be comprised of a set of physical paths (i.e., serially connected links and their included nodes along with the origin and destination nodes) within the network.

Figure 1:
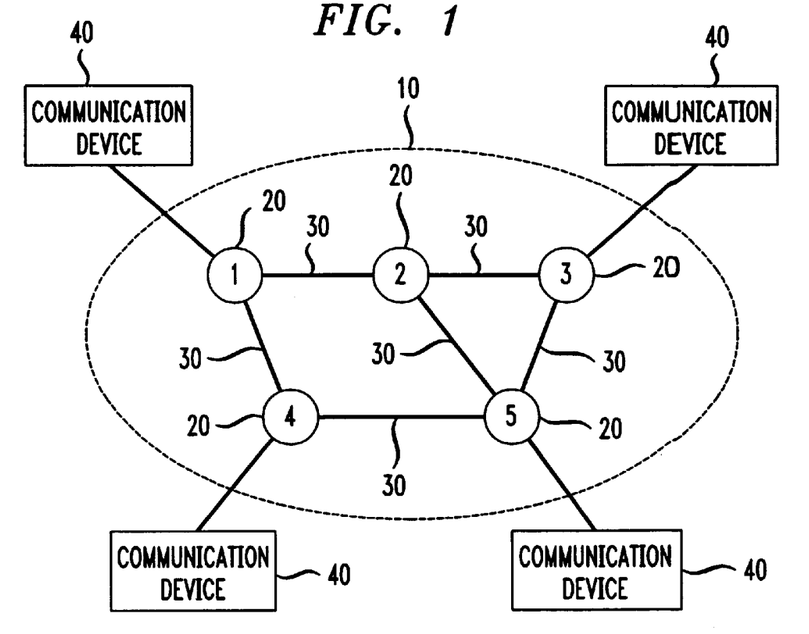
FIG. 1 illustrates a network configuration according to an embodiment of the present invention.

FIG. 1 shows an exemplary wide area network illustrative of the configuration and operation of a contemporary communications network. Network 10 comprises a plurality of switching nodes 20 and links 30. Each of the nodes 20 may also have associated therewith a buffer (not shown) of predetermined size and each of the links 30 will have associated therewith a predetermined traffic handling capacity. Note that the depiction of a network comprising only five nodes is for convenience of illustration, and that an operating network may have a much larger number of nodes and associated connecting links.

Various nodes are shown illustratively connected to Communications Devices 40. It should be understood that the single communications devices shown connected to the nodes in the figure are used for simplicity of illustration, and that an actual implementation of such a network would ordinarily have a number of communications devices connected at each of those nodes. Note, as well, that the illustrated communications devices may also represent another network, such as a LAN, which is connected to network 10.

Each communications device 40 generates information for use by, or receives information from, other communications devices in the network. The term "information" as used herein is intended to include data, text, voice, video, etc. Information from communications device 40 is characterized by a set of transmission and/or rate parameters related to network link and buffer requirements needed to accommodate transmission of such information.

In the design and operation of an information network, such as network 10, a concept that is frequently applied is that of a logical or virtual circuit or virtual connection between sending and receiving communications devices in the network. The basic idea of a virtual connection is that of a logical partitioning of a physical network into a number of virtual circuits generally serving different users and/or services. Such a virtual connection generally follows a single physical path (comprising a series of interconnected links between a sending and a receiving communication device) at any given time. Note, however, that multiple virtual circuits may share capacity in a single physical path through a network.

Communications networks will often use a networking protocol called Asynchronous Transfer Mode (ATM). The development of ATM networks is fueled by the need for efficient utilization of wide-area network resources, scalable bandwidth and support for quality of service. Indeed, it is generally believed that, within the next 5–10 years, most of the voice and data traffic generated throughout the world will be transmitted by ATM technology. Broadband packet networks based on Asynchronous Transfer Mode are enabling the integration of traffic with a wide range of characteristics within a single communication network. In these networks, all communication at the ATM layer is in terms of fixed-size information segments, called "cells" in ATM terminology. An ATM cell consists of 48 bytes of payload and 5 bytes for the ATM-layer header. Routing of cells is accomplished through packet switches over Virtual Connections (hereafter "VC") set up between endpoints. Packets of information may be broken up (or segmented) into multiple cells, each cell carrying the 48 bytes of information sequentially. The destination reassembles the cells received into the original packet. The assumption, at least for cells using the AAL5 (ATM adaption layer, version 5) adaptation layer protocol, is that all of the cells of a packet are delivered in order for a given VC, and hence can be assembled, as they arrive in order.

A defining property of the SEAM methodology is a shared tree between all senders and receivers of a group. The concept of a "core" is used as the root of the tree to be set up. The core acts primarily as an anchor for other nodes to forward signaling messages to it. Thus, every router/switch in the tree participates in the forwarding of traffic, including the router/switch which was chosen to be the core for signaling purposes. The SEAM methodology manages group members who are only senders, only receivers, or both, in the same way. All of these three types of members share one tree, rooted at the core. The tree's links are bi-directional channels. The core may be an ATM switch which provides the added role of being an anchor for signaling messages to be sent toward it, when senders/receivers are added. Segmentation-reassembly is not required at the core and only occurs in the end-systems that are senders and receivers.

Signaling for the multipoint-to-multipoint multicast SEAM methodology is based on a group handle. A handle is a unique conversation identifier for the SEAM methodology. That handle is used in signaling messages to facilitate the association of appropriate input and output ports/VCs for the multicast group in the core and each of the switches/routers in the tree—i.e., the handle for a particular multicast group enables the mapping of input VCs for that group at a particular switch to the corresponding output VC(s) at that switch (in accordance with a routing table set up in each such switch). The handle consists of the core address plus an identifier. The core address is necessary because it allows members and intermediate switches to know the core through the group handle. Note that to make the handle globally unique, it is sufficient to make the additional identifier locally (at the core) unique.

Because a defining property of the SEAM methodology is the use of a shared tree between all senders and receivers, a commonly designated VC (per link) can serve all senders and all receivers in a group. For this shared tree multicasting methodology to work, it is necessary to be able to map multiple incoming VCs into one or several outgoing VCs at switches. While such mapping is straightforward at the packet level, a sub-packet network such as ATM introduces a substantial complication to such a mapping process.

The AAL5 adaptation layer protocol is commonly applied for data transfer applications using ATM. With the AAL5 protocol, a packet is broken up into a number of ATM cells, where those cells are sequentially ordered and related to the underlying packet by the VC identifier and an "end of packet" marker. The cells are then routed through packet switches over VCs set up between endpoints. The destination reassembles the cells received into the original packet. The assumption, at least for cells using the AAL5 adaption layer protocol, is that all of the cells of a packet are delivered in sequential order for a given VC, and hence can be assembled sequentially as they arrive.

In an embodiment of the SEAM methodology, the ATM cells are constructed in accordance with the AAL5 adaptation layer protocol. As explained above, under the shared tree concept of the SEAM methodology, a commonly designated VC serves all senders and all receivers in a group. Thus, multiple links will carry this commonly designated VC, and at least in some instances two or more such links will be connected to input ports of a single switch. Now, since a particular packet is identified by its VC, the occurrence of a common VC at multiple input ports of a switch would result in chaos if the switch mapped from input to output ports in the straightforward manner. That is, if such mapping is done simply on a cell-by-cell basis (by VC identifier and in the order received), then cells belonging to different packets (and contemporaneously arriving at different input ports, but identified by the common VC) will interfere with each other—more particularly, such cells will be interleaved, resulting in corruption of the underlying packets.

With the AAL5 protocol, the constraint imposed by ATM is that the data on a particular VC is ordered. Given that ordering, and the fact that the ATM cell header contains an end-of-packet (EOP) designator, the cells comprising a packet may be determined by the fact that all the cells between two cells with their EOP flag set belonging to the same VC constitute a packet. When a cell containing the EOP flag is received, all the previous cells received on that VC are understood to belong to that packet.

With multiple senders transmitting to the same multicast group, however, these communications arrive on the same commonly-designated VC. Thus, it will be readily appreciated that when multiple senders send packets on the same VC, these packets need to be unambiguously ordered and forwarded so that there is no corruption of the data transmissions. As explained above, such unambiguous ordering and forwarding cannot be accomplished with a straightforward mapping of input VCs to output VCs. With the SEAM methodology, however, such unambiguous ordering and forwarding can be accomplished by having the switches perform a function designated as cut-through. Switches performing this cut-through function forward complete packets at a time, while buffering incoming packets from other input ports until the complete packet has been forwarded, as indicated by the forwarding of an EOP cell for the currently "being forwarded" packet.

Figure 2:
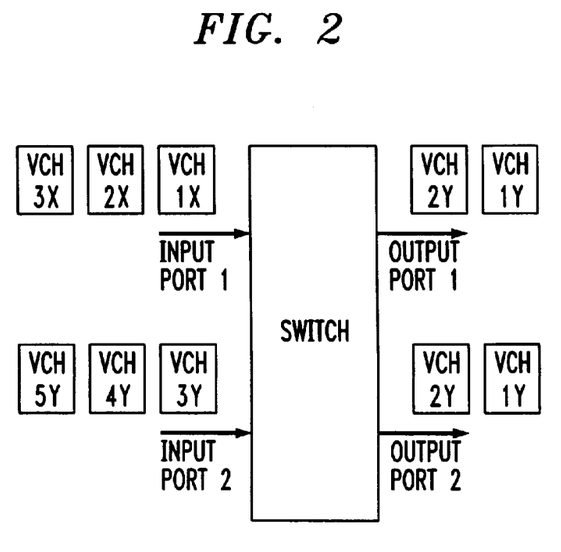
FIG. 2 schematically depicts the cut-through function for SEAM methodology.

To illustrate the operation of this cut-through function, consider the case where two senders, A and B (not shown) are transmitting data packets X and Y respectively to a set of receivers, as depicted in FIG. 2. These data arrive at input ports 1 and 2, respectively, for the indicated switch, which is illustrative of one of the switches in the shared tree. If the networks were packet-based, rather than ATM, where packets were not being segmented into cells, the action of cut-through forwarding is simple: packet X would be transmitted and subsequently packet Y would be transmitted, both being identified by the handle H, which is the group handle. Whichever packet arrived first gets transmitted first.

With ATM networks, however, packets are segmented into cells and senders A and B transmit packets X and Y, with the same VC, which illustratively is designated as VC H. Note that, while it is convenient for illustrative purposes to assume that all VCs are commonly designated by the group handle, "H", in practice each switch port is likely to have a different designation for the group VC, with the association of such different VC designations to the group handle being maintained in routing tables in the switches, based on signaling messages from, or in behalf of, each of the senders and/or receivers in the multicast group. Packets X and Y are distinguished because of the fact that they arrive on different input ports of the switch, even though they arrive on the same logical VC.

Now, as previously noted, because the cell is the unit of transmission, rather than a packet, if the cells from packet X and Y, arriving at input ports 1 and 2, were forwarded without regard to packet association for the cells, it is likely that such forwarded cells will be interleaved resulting in corruption of the underlying packets. Thus it can be seen that forwarding cells in the order received, independent of which port at which they have arrived, on the same outbound VC is undesirable. To overcome this problem, the behavior of packet networks has to be replicated. That is, the cells comprising an entire packet, as received at an input port, are forwarded before any cells received on another input port may be forwarded. In this manner, the receivers do not have to distinguish cells of different packets arriving on the same VC (which would, in any event, be an impossible task).

This cut-through process is carried out by having the following actions carried out at the switch: the first cell of a packet arriving from any input port on VC H determines that this packet arriving on that input port gets unconditional priority to be forwarded on the outgoing VC H. Let this packet be Y from source B. Then, all of the cells of packet Y are forwarded first. Any other packet arriving on any other input port is queued at the switch for forwarding subsequent to the transmission of packet Y. For example, since, under the illustrative hypothesis, the first (and hence all) of the cells of packet X are received after the first cell of packet Y is sent, these are queued. When the last cell of packet Y (signified by the EOP cell, and designated 5Y in the figure) is transmitted, then the cells queued for packet X are transmitted from the switch on the spanning tree. From that point onwards, packet X gets priority for being transmitted on VC H until it has been completely forwarded by the switch. Although the cut-through function described herein has been illustrated in the context of a single switch, it should be understood that this function would be implemented for each switch in the shared tree.

Thus, it will be seen that the requirement on a switch in the shared tree performing "cut-through" is to identify the first cell of an incoming packet on a given multicast VC H, and to transmit cells received on that input port only, until the last cell of that packet has been transmitted. The cells from other input ports that arrive in the meanwhile on VC H are queued for forwarding subsequent to sending the last cell of the currently being forwarded packet.

Furthermore, the switch may be arranged to consider the network transmission speed for packets being received at an input port. For example, it may be known that the transmission speed for packets received at a particular input port will be low—possibly because the port itself is slow, or possibly because the VC on that port has low bandwidth. In that case, forwarding priority may not be granted on the basis of the first input port to receive cells of a new packet. Rather, where such an input port (or the VC on that port) is characterized by a slow transmission speed, cells coming into that port may be buffered and the cells arriving at a higher-speed port forwarded (even though not first in time of arrival at the switch) while the full packet is received for the slower input port. This provides the obvious advantage of avoiding a delay in forwarding packets from higher speed ports due to the switch being tied up waiting for a low speed packet to completely arrive on the low speed port and be processed through the switch.

Another feature of the cut-through methodology relates to a time-out mechanism which can be implemented in the case where the EOP cell of a packet is lost. As discussed above, when a switch has received a packet cell for a given VC, packet cells for that same VC received on other input ports will be buffered until the first received packet is completely received and forwarded. When the packet's EOP marker cell is lost, however, the normal indication that the one of other buffered packets for that same VC can now be forwarded is also lost. To overcome this problem, a time-out can be provided in the cut-through process regarding the waiting time for an additional cell for that on a VC at the input port. Upon timeout, the switch can regenerate a "dummy" EOP cell for the given VC, so that such dummy EOP cell can be forwarded, complete the packet, and thus allow other packets to now be forwarded from other input ports. Such a time-out procedure is only needed when a packet is currently being cut through and the EOP cell has not yet been received at the input port.

The method of performing "cut-through" as described in pending application Ser. No. 08/631,869, however, leaves several issues unresolved. As discussed above, when multicast senders send packets on the same VC, the cells for a given packet need to be completely forwarded in sequential order before cells from other packets with the same VC designation are forwarded; thus, data transmissions are not corrupted due to the interleaving of data which cannot be later de-interleaved. Another problem arises, however, when a packet for one multicast sender is being forwarded on one VC, for example VC1, from a buffer, for example B1, at a switch and packets for VC1 from another multicast sender are buffered, for example B2, at the same switch. While the VC1 packets at B2 remain buffered until VC1 packets at B1 are completely transmitted, additional packets for other VCs, for example VC2, are buffered at B2 behind the VC1 packets. Other VCs such as VC2 can be multicast or unicast VCs. Because the packets for VC1 and the packets for VC2 have different identifiers, no reason exists to postpone the packets for VC2 to be forwarded. In such a case, however, this is not possible because the packet for VC2 is buffered at the end of the B2 queue and cannot be forwarded until the forwarding of packets for VC1 is completed. Where the packets for VC2 are more latency sensitive than the packets for VC1, performance is significantly limited. This is also known as a "head-of-the-line" blocking problem. The potential latency problems can be significantly greater when the above simplified case is expanded to consider a case with several more input ports, multicast VCs and unicast VCs and buffered packets.

SUMMARY OF THE INVENTION

The present invention improves upon the utilization of buffered switches in multipoint-to-multipoint multicasting. Multipoint-to-multipoint multicasting can be performed in a communications network comprised of interconnected switching nodes and transmission links defining transmission paths therein. The communications network can be arranged to carry discrete segments of information between information sources and information receivers. A unique mutlicast group identifier is associated with a subset of information sources and information receivers; the subset of information sources and receivers constitutes a multicast group. The buffered switching nodes can include an output-buffered switch, shared-memory switch or an input-buffered switch. Spanning trees are used for the interconnection among all senders and receivers.

The present invention establishes a buffer queue at the output port buffer for each multicast group identifier associated with an information segment routed to one or more output ports. Each information segment has a plurality of portions including a terminal portion and each portion has a multicast group identifier. Each information segment portion routed to the output port is buffered in the buffer queue corresponding to the mutlicast group identifier associated with the information segment portion. All portions of an information segment having a given multicast group identifier are then forwarded before any portion of another information segment having the same multicast group identifier are forwarded.

Output-buffered switches and shared-memory switches of the present invention have several advantages. First, due to the use of spanning trees, each output port of output-buffered switches and shared-memory switches can forward information segments buffered at that output port independent of the other output ports. According to one embodiment of the present invention, each information segment portion is marked with an input port identifier indicating the input port from which the information segment portion originated and then portions of an information segment having the same input port identifier are linked together. Thus, each output port can independently forward buffered information segments. Alternatively, a buffer queue at each output port can be established for each input port from which an information segment portion was routed for each multicast group identifier. Additionally, output-buffered switches and shared-memory switches of the present invention can establish a unique time-out period unique for each output port.

Unlike output-buffered switches or shared-memory switches, input-buffered switches require coordination to forward information segments. In an input-buffered switch, each input port has to determine the status of the other input ports and to determine an order for forwarding to the same output port information segments having the same multicast group identifier and being buffered at different input ports. In such a case, method of contention resolution is provided to determine the order in which information segments having the same multicast group identifier are forwarded to the same output port. For example, contention can be resolved by a round robin method or randomly.

The present invention can operate when the communication network operates in accordance with a networking protocol known as Asynchronous Transfer Mode ("ATM"). In such a case, the information segments are established as packets and the information segment portions are packet cells, as defined by the ATM protocol.

DETAILED DESCRIPTION

Figure 3:
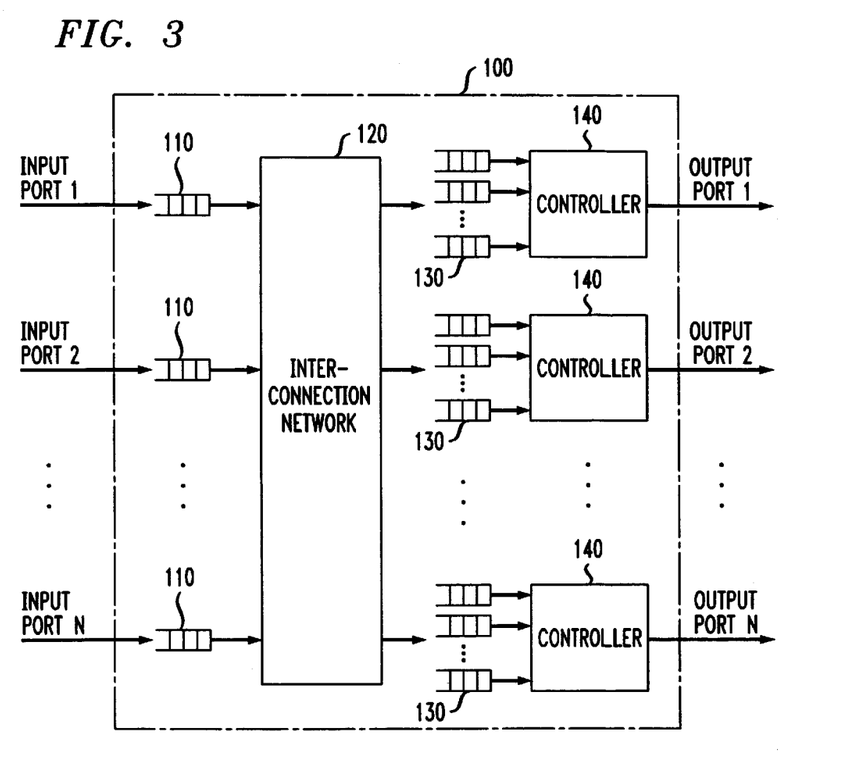
FIG. 3 illustrates an output-buffered switch according to an embodiment of the present invention.

FIG. 3 illustrates a possible system configuration for an output buffered switch according to an embodiment of the present invention. Output buffered switch 100 includes multiple input ports designated input port 1 to input port n, and multiple output ports designated output port 1 to output port n. Each input port is connected to buffer 110. The output of each buffer 110 is connected to interconnection network 120 which allows switching between the input ports and output ports. Multiple buffers 130 and controller 140 are connected between interconnection network 120 and each output port. Buffers 130 may be physically separate, a physical buffer divided logically into separate buffers or a combination of both. Each buffer is first-in-first-out (FIFO) to preserve the sequential order of cells received for a given VC. Controller 140 manages the order in which buffers 130 output to the output port.

Buffer 130 at any given output port must be established for each multicast VC associated with that output port, although additional buffers can be established to queue, for example, unrelated unicast VCs. Stated another way, for every multicast VC at a particular output port, the switch must establish a dedicated buffer queue. This feature of the present invention known as per VC queuing can be generalized beyond only output-buffered switches. Although specific implementations vary, per VC queuing can also be applied to shared-memory switches and, as will be discussed below, input-buffered switches. Generally speaking, by establishing a buffer queue for each multicast VC at each port, the latency problems in the prior art associated with packets being trapped in a buffer queue behind a delayed multicast packet off a different VC are solved.

Figure 4:
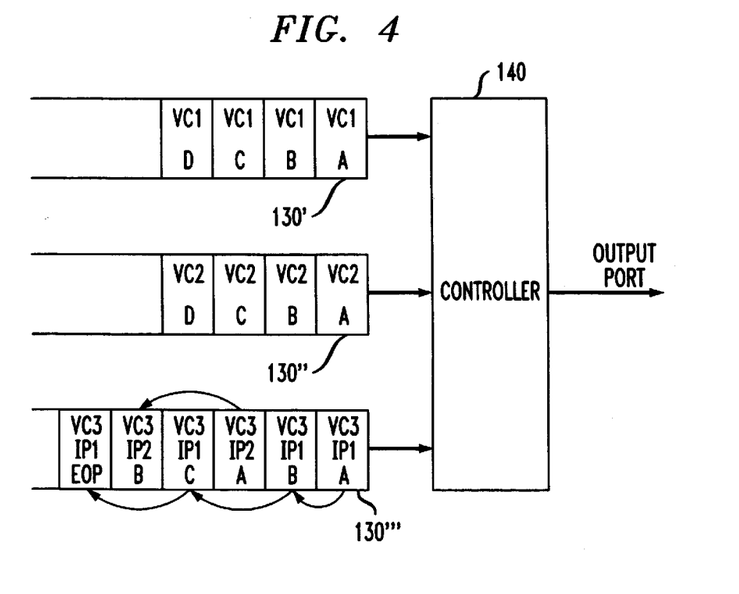
FIG. 4 illustrates a segment of an output-buffered switch with per VC queuing according to an embodiment of the present invention.

The specific implementation of per VC queuing feature for an output-buffered switch will be discussed in connection with FIG. 4. FIG. 4 illustrates a segment of an output buffered switch 100. Specifically, FIG. 4 illustrates the buffer queues associated with a specific output port and shows examples of specific cells in the various buffer queues for illustration purposes. As shown in FIG. 4, a buffer queue is established for each VC at the output port: buffer 130' for VC1, buffer 130" for VC2, and buffer 130''' for VC3. These buffers are connected to controller 140 which manages the order that the buffers output to the output port. Each output port has its own controller. As cells are received from an input port on VC1, they are buffered in buffer queue 130': cell A is received first, followed by cells B, C, D, etc. Similarly, as cells are received from an input port on VC2, they are buffered in buffer queue 130" in the order they are received: A, B, C, D, etc. VC1 and VC2 may be either a unicast or multicast VC. Note that although the present invention focuses on queuing techniques for multicast VCs, unicast VCs can also use per VC queuing for independent reasons.

Finally, VC3 is a multicast VC which receives cells from both input port 1 and input port 2. Because FIG. 4 relates to an output-buffered switch, cell headers for multicast VC3 are marked to indicate from which input port they originated. Thus, as shown, the sequential contents of buffer queue 130''' are cell A for VC3 originating from input port 1 (VC3/IP1/A), cell B for VC3 originating from input port 1 (VC3/IP1/B), cell A for VC3 originating from input port 2 (VC3/IP2/A), cell C for VC3 originating from input port 1 (VC3/IP1/C), cell B for VC3 originating from input port 2 (VC3/IP2/B), end-of-packet cell for VC3 originating from input port 1 (VC3/IP1/EOP), etc.

Within buffer queue 130''', the cells for each originating input port are then linked together. The cells for each originating input port can be linked, for example, by conventional pointers. The contents of buffer queue 130''' of FIG. 4 would linked in the following order: VC3/IP1/A, VC3/IP1/B, VC3/IP1/C, VC3/IP1/EOP, VC3/IP2/A, VC3/IP2/B, etc. Note that the cells originating from input port 1 are linked together until the end-of-packet cells is received, and then the cells originating from input port 2 are linked together. As the contents of buffer queue 130''' are selected by controller 140 to be output to the output port, the order in which the cells are output are based on the linked list. Thus, the cells originating from input port 1 are sequentially output until one packet is completely removed from buffer 130''', and then the cells originating from input port 2 are sequentially output until another packet is completely removed from buffer 130'''.

Thus, the advantage of the present invention can now be better understood. Packets for a multicast VC (e.g., VC3 as illustrated in FIG. 3) are buffered in the same buffer queue and later sequentially output thereby preventing their being interleaved with and consequentially corrupted by cells for the same VC. Simultaneously, the cells of packets for other VCs are buffered in separate queues thereby preventing their being trapped behind delayed multicast cells (e.g., cells for VC1 and VC2 can be output to the output port before an entire packet of VC3 is completely output).

Figure 5:
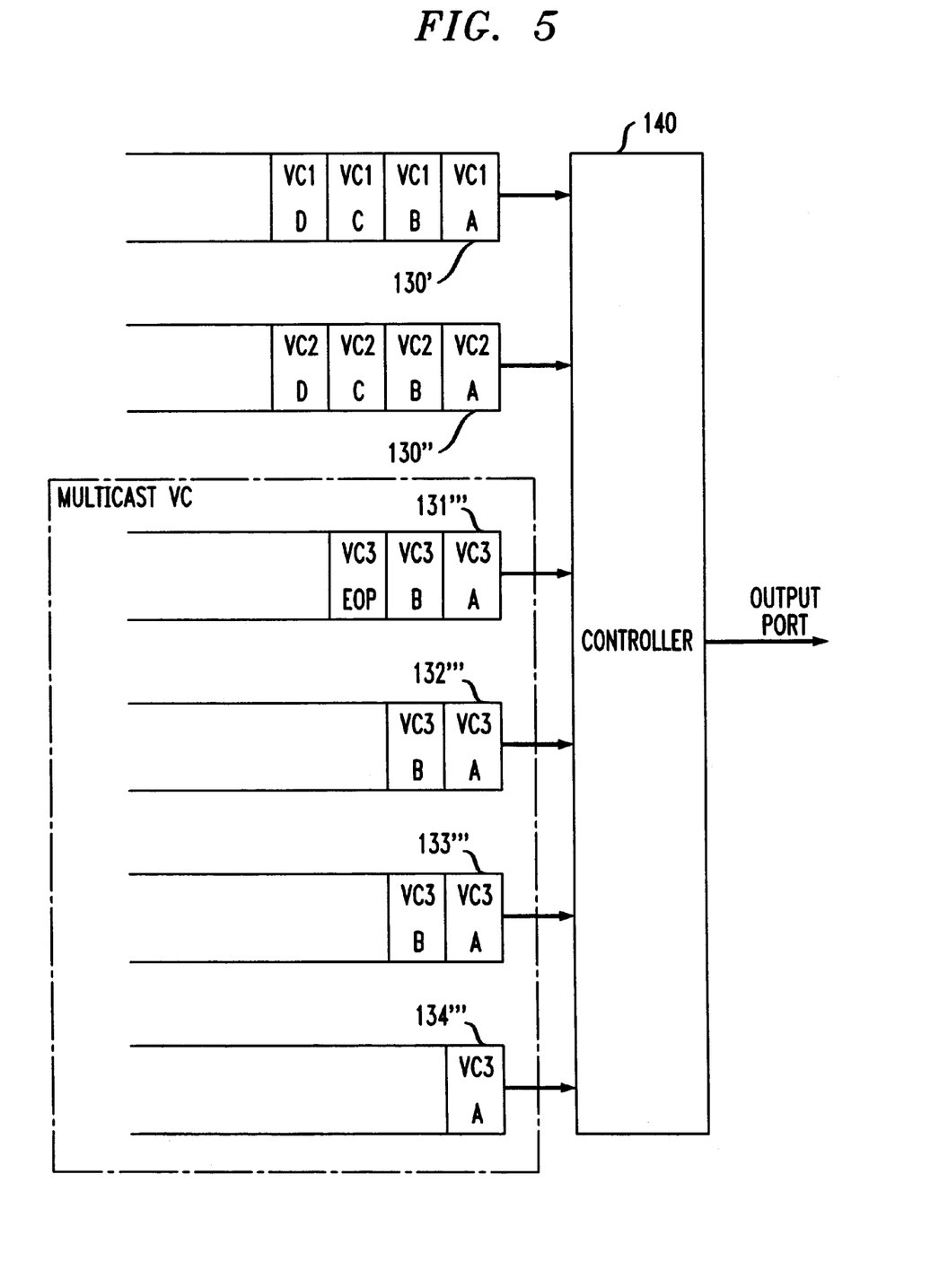
FIG. 5 illustrates a segment of an output-buffered switch with per VC queuing according to a second embodiment of the present invention.

FIG. 5 illustrates a segment of an output buffered switch 100 according to a second embodiment of the present invention. Specifically, FIG. 5 shows a configuration where a separate buffer is established for each multicast VC at an output port for each input port from which cells are received. As shown in FIG. 4, buffer 130' is established for VC1 and buffer 130" is established for VC2. VC1 and VC2 can be unicast VCs.

Multiple buffers are established for multicast VC3. A separate buffer queue is established for each input port from which multicast VC3 cells are received: buffer 131''' for input port 1, buffer 132''' for input port 2, buffer 133''' for input port 3, and buffer 134''' for input port 4. As a multicast VC3 cell is received, it is buffered in the buffer queue corresponding to the originating input port. For example, when VC3/B is received from input port 3 it is buffered in buffer 133''' behind VC3/A previously received from input port 3. Note that this embodiment is an alternative to the linked list for each multicast VC buffer illustrated in FIG. 4.

Output buffered switching of the present invention, however, is effective only where routing interference does not exist further down the network. Routing interference would normally exist, for example, where packets for a particular VC converge at one node, separate into multiple output paths that converge further down the network. In such a case, an eventual receiver would receive multiple copies of the same packet. Such routing interference can be avoided through the use of spanning trees which are well known. For example, see R. Perlman, *Interconnections: Bridges and Routers*, Addison-Wesley, 1992.

Note that the basic techniques described above for per VC queuing in an output-buffered switch can similarly by implemented in a shared-memory buffered switch. In a shared-memory buffered switch, incoming cells are routed into a common memory while the cell headers can be routed to a memory controller which determines the order in which the cells are to be forwarded. Functionally, a shared-memory buffered switch can be considered identical to an output-buffered switch where the output buffers all physically belong to a common buffer pool and are controlled by a central controller. Thus, the prior discussion of the present invention for output-buffered switches is equally applicable to shared-memory switches.

Figure 6:
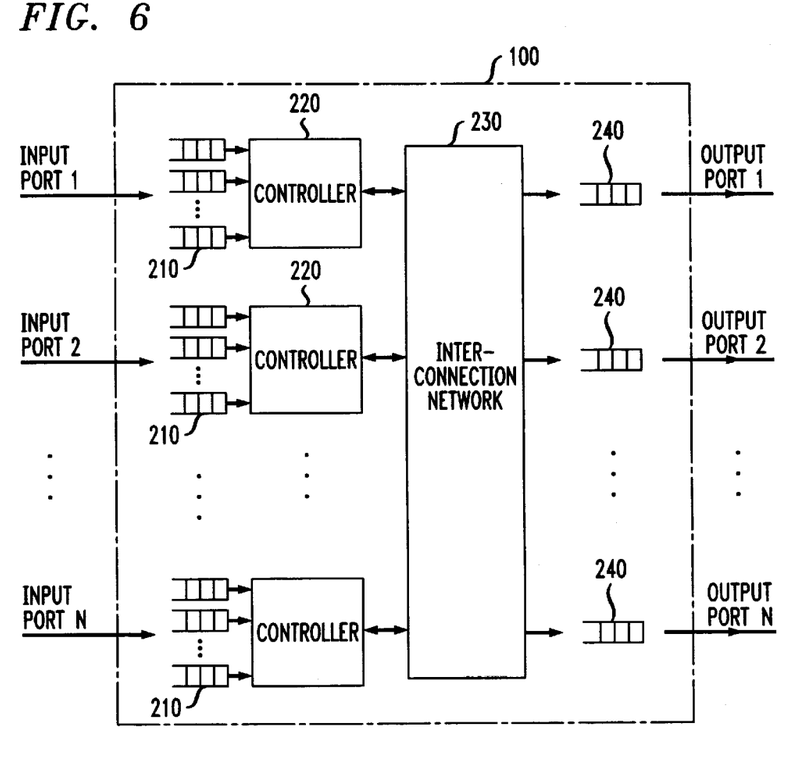
FIG. 6 illustrates an input-buffered switch according to an embodiment of the present invention.

The present invention can also be implemented for input-buffered switches. FIG. 6 illustrates a possible system configuration for an input-buffered switch according to an embodiment of the present invention. Input buffered switch 200 includes multiple input ports designated input port 1 to input port n, and multiple output ports designated output port 1 to output port n. Each input port is connected to multiple buffers 210. Buffers 210 may be physically separate buffers, a physical buffer divided logically into separate buffers or multiple physically separate buffers at least one being divided logically into additional separate buffers. Each set of buffers 210 associated with a given input port is connected to separate controller 220. Each controller 220 associated with a given input port is connected to interconnection network 230 which allows switching between the input ports and output ports. Controller 220 manages the order in which buffers 210 output to the interconnection network 230.

Controller 220 for each input port must be capable of sending and receiving control information to and from controller 230, respectively, for reasons unique to input-buffered switches, as discussed below.

Similar to output-buffered switches, the number of buffers 210 at any given input port for an input-buffered switch must equal the number of VCs for that input port. The illustration of per VC queuing for output-buffered switches shown in FIG. 4 is analogous for input-buffered switches with one exception. Unlike an output-buffered switch where each output port can independently determine when to forward particular cells, controller 220 for each input port in an input-buffered switch must interdependently determine when to forward particular cells to controller 230 based on the status of all other input ports for that input-buffered switch. Controller 220 for each input port must forward packets based on the status of the other input ports to prevent the cells for a given VC received at one input port from being interleaved and corrupted with the cells for that same VC received at another input port. In other words, controller 220 for each port does not forward any cells for given multicast VC until the currently forwarded packet for that multicast VC has forwarded the EOP cell and until no other packet for that multicast VC is being forwarded by any other input port.

Figure 7:
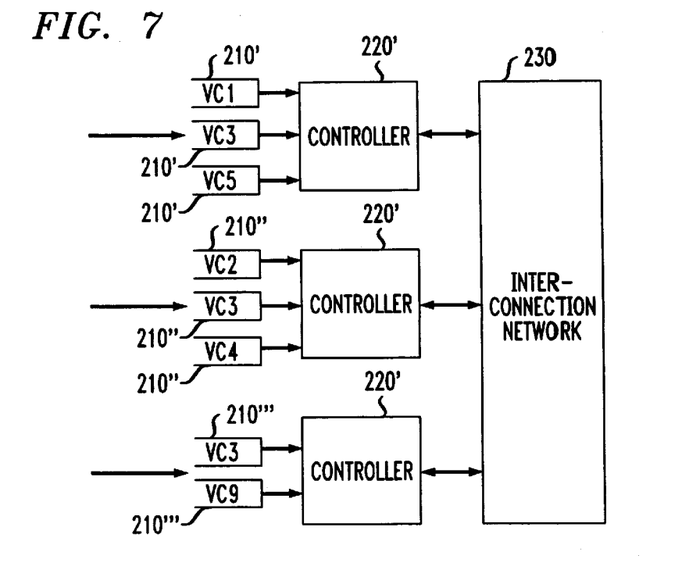
FIG. 7. illustrates a segment of an input-buffered switch with per VC queuing according to an embodiment of the present invention.

FIG. 7 illustrates the case where packets for the same multicast VC are received at different input ports of an input-buffered switch. FIG. 7 shows a portion of an input-buffered switch. As shown in FIG. 7, a buffer queue is established for each VC at each input port. At input port 1, a separate buffer queue 210' is established for VC1, multicast VC3 and VC5, and is connected to controller 220'. At input port 2, a buffer queue 210" is established for VC2, multicast VC3 and VC4, and is connected to controller 220". At input port 3, a buffer queue 210''' is established for multicast VC3 and VC9, and is connected to controller 220'''. Controllers 220', 220' and 220''' are connected to interconnection network 230.

If a new packet arrives on input port 2 for multicast VC3, for example, and the other input ports are not forwarding a packet for multicast VC3, then all the cells for that packet get unconditional priority to be forwarded through interconnection network 230 to the output port for VC3 and are buffered in buffer queue 210" associated with VC3 only as necessary. When the first cell of another packet for that same multicast VC3 arrives on input port 1, those cells are buffered by buffer 210' associated with VC3 and their forwarding is postponed until the first packet stored in part at buffer queue 210" on input port 2 is completely forwarded. In the meantime, packets for VC3 can also arrive at input port 3. Now when the first received packet stored in buffer queue 210" associated with VC3 of input port 2 is completely forwarded, one of the packets for VC3 buffered at either input port 1 or input port 3 can be forwarded. But, because multiple packets for the same VC3 are being buffered at other input ports, these buffered packets are contending for forwarding. In such a case, a method of contention resolution is necessary to select which input port's buffered packet will be forwarded next.

One method of contention resolution is to select the next input port for forwarding sequentially based on the number of the port in a "round robin" fashion. Under the round robin method of contention resolution, after the packet for VC3 from input port 2 was completely forwarded, the packet for VC3 from input port 1 would be forwarded followed by the packet for VC3 from input port 3. In this manner, the contention between input port 1 and 3 regarding the forwarding of packets for multicast VC3 is resolved. It should be understood that the present invention can utilize any number of mechanisms to communicate that an input port is contending to forward a packet for multicast VC3, for example, and to determine which input ports are also contending to forward packets for multicast VC3. Note also that the present invention is not limited to the round robin method of contention resolution and that other methods of contention resolution are possible, such as random selection, etc.

Note that output-buffered switching and shared-memory switching has the advantage over input-buffered switching that each output port in an output-buffered switch or a shared-memory switch can make independent forwarding decisions for packets of multicast VCs. Unlike input buffered switching where each input port must be aware of the status of the other input ports to perform contention resolution, the output ports in an output buffered switch or a shared-memory switch do not need to know the status of the other output ports.

Another feature of the present invention relates to a time-out mechanism which can be implemented for an output-buffered switch or a shared-memory switch in the case where the EOP cell of a packet is lost. As discussed above, because the implementation of the cut-through methodology for an output-buffered switch and a shared-memory switch allows packet forwarding decisions to be made independently of packet forwarding by other ports, the time-out period for the insertion of a "dummy" EOP can be varied for each output port. This feature takes advantage of the possible different bandwidths available for each output port.

Where one output port has a larger bandwidth than another output port, the time-out period associated with the larger bandwidth output port can be less than the time-out period associated with the smaller bandwidth output port. By individualizing the time-out period for each output port, the bandwidth capability of one output port is not wasted while waiting for the longer time-out period associated with the smaller bandwidth output port.

What is claimed is:

1. In a communications network comprised of interconnected switching nodes and transmission paths therein, wherein the communications network is arranged to carry discrete segments of information between information sources and information receivers, a unique multicast group identifier being associated with a subset of information sources and information receivers, the subset of information sources and receivers constituting a multicast group, a method for multipoint-to-multipoint multicast routing of information segments at the switching nodes including an output-buffered switch or shared-memory switch using a spanning tree and having a buffer associated with each output port, said method comprising:

(a) routing a set of information segments to an output port buffer, the set of information segments having a plurality of multicast group identifiers, each information segment having a plurality of portions including a terminal portion, each portion having a multicast group identifier from the plurality of multicast group identifiers; and (b) establishing, at the output port buffer to which the set of information segments having at least two multicast group identifiers are routed, at least two queues, each queue corresponding to an individual multicast group identifier from the plurality of multicast group identifiers.

2. The method of claim 1, further comprising the step of:

(c) forwarding all portions of a first information segment from the set of information segment and having a first multicast group identifier from the plurality of multicast group identifiers prior to forwarding any portion of another information segment having the first multicast group identifier; said forwarding step (c) is performed without coordination among output ports.

3. The method of claim 1, further comprising the step of:

(c) inserting a terminal portion of an information segment after a time-out period unique for the output port when an originally transmitted terminal portion of the information segment has been identified as not received.

4. The method of claim 1, wherein said establishing step (b) further comprises the substeps of:

(i) marking each information segment portion from the set of information segments with an input port identifier indicating the input port from which the information segment portion originated; and (ii) linking together portions of an information segment from the set of information segments having the same input port identifier.

5. The method of claim 1, wherein said establishing step (b) establishes a queue at the output port for each input port from which an information segment portion from the set of information segments was routed for each multicast group identifier from the plurality of information segments.

6. The method of claim 1, wherein the communication network operates in accordance with a networking protocol known as Asynchronous Transfer Mode ("ATM") and wherein the information segments from the set of information segments are established as packets and the information segment portions are packet cells, as defined by the ATM protocol.

7. In a communications network comprised of interconnected switching nodes and transmission links defining transmission paths therein, wherein the communications network is arranged to carry discrete segments of information between information sources and information receivers, a unique multicast group identifier being associated with a subset of information sources and information receivers, the subset of information sources and receivers constituting a multicast group, a buffered switch for multipoint-to-multipoint multicast routing of information segments at the switching nodes, said buffered switch including an output-buffered switch or shared-memory switch using a spanning tree, said buffered switch comprising:

a plurality of input ports interconnected to a plurality of output ports;

a plurality of buffers, each buffer being uniquely associated with one of said plurality of output ports, a set of information segments being routed to an output port buffer from the plurality of output port buffers, the set of information segments having a plurality of multicast group identifiers, each information segment having a plurality of portions including a terminal portion, each portion having a multicast group identifier from the plurality of multicast group identifiers, the output port buffer to which the set of information segments having at least two multicast group identifiers are routed establishing at least two queues, each queue corresponding to an individual multicast group identifier from the plurality of multicast group identifiers.

8. The buffered switch of claim 7, further comprising:

a plurality of controllers, each controller being connected between one of said plurality of buffers and one of said plurality of output ports, each controller forwarding all portions of a first information segment from the set of information segments and having a first multicast group identifier from the plurality of multicast group identifiers prior to forwarding any portion of another information segment having the first multicast group identifier and forwarding without coordination among controllers.

9. The buffered switch of claim 8, wherein each controller inserts a terminal portion of an information segment after a time-out period unique for the connected output port when an originally transmitted terminal portion of the information segment has been identified as not received.

10. The buffered switch of claim 7, wherein the output buffer marks each information segment portion from the set of information segment with an input port identifier indicating one of said plurality of input ports from which the information segment portion originated, the output buffer links together portions of an information segment having the same input port identifier.

11. The buffered switch of claim 7, wherein the output buffer establishes a queue for each of said plurality of input ports from which an information segment portion from the set of information segments was routed for each multicast group identifier from the plurality of information segments.

12. The buffered switch of claim 7, wherein the communication network operates in accordance with a networking protocol known as Asynchronous Transfer Mode ("ATM") and wherein the information segments from the set of information segments are established as packets and the information segment portions are packet cells, as defined by the ATM protocol.

13. In a communications network comprised of interconnected switching nodes and transmission links defining transmission paths therein, wherein the communications network is arranged to carry discrete segments of information between information sources and information receivers, a unique multicast group identifier being associated with a subset of information sources and information receivers, the subset of information sources and receivers constituting a multicast group, a method for multipoint-to-multipoint multicast routing of information segments at the switching nodes including an input-buffered switch having a buffer associated with each input port, said method comprising:

(a) receiving a set of information segments at an input port buffer, the set of information segments having a plurality of multicast group identifiers, each information segment having a plurality of portions including a terminal portion, each portion having a multicast group identifier from the plurality of multicast group identifiers; and (b) establishing, at the input port buffer at which the set of information segments having at least two multicast group identifiers are received, at least two queues, each queue corresponding to an individual multicast group identifier from the plurality of multicast group identifiers.

14. The method of claim 13, further comprising the step of:

(c) forwarding all portions of a first information segment from the set of information segment having a first multicast group identifier from the plurality of multicast group identifiers prior to forwarding any portion of another information segment having the first multicast group identifier.

15. The method of claim 13, further comprising the step of:

(c) inserting a terminal portion of an information segment after a time-out period for the input port when an originally transmitted terminal portion of the information segment has been identified as not received.

16. The method of claim 14, wherein said forwarding step (c) resolves contention in forwarding a first information segment from the set of information segments buffered at a first input port to an output port and in forwarding a second information segment from the set of information segments buffered at second input port to the output port.

17. The method of claim 16, wherein said forwarding step (c) resolves contention by a numerical round robin selection of the input ports.

18. The method of claim 16, wherein said forwarding step (c) resolves contention by a random selection of the input ports.

19. The method of claim 13, wherein the communication network operates in accordance with a networking protocol known as Asynchronous Transfer Mode ("ATM") and wherein the information segments from the set of information segments are established as packets and the information segment portions are packet cells, as defined by the ATM protocol.

20. In a communications network comprised of interconnected switching nodes and transmission links defining transmission paths therein, wherein the communications network is arranged to carry discrete segments of information between information sources and information receivers, a unique multicast group identifier being associated with a subset of information sources and information receivers, the subset of information sources and receivers constituting a multicast group, an input-buffered switch for multipoint-to-multipoint multicast routing of information segments at the switching nodes, comprising:

a plurality of input ports interconnected to a plurality of output ports;

a plurality of buffers, each buffer being uniquely associated with one of said plurality of input ports, a set of information segments being received at an input port buffer from the plurality of input port buffers, the set of information segments having a plurality of multicast group identifiers, each information segment having a plurality of portions including a terminal portion, each portion having a multicast group identifier from the plurality of multicast group identifiers, the input port buffer at which the set of information segments having at least two multicast group identifiers are received establishing at least two queues, each queue corresponding to an individual multicast group identifier from the plurality of multicast group identifiers.

21. The input-buffered switch of claim 20, further comprising:

a plurality of controllers, each controller being connected between one of said plurality of buffers and said plurality of output ports, each controller forwarding all portions of a first information segment from the set of information segments having a first multicast group identifier from the plurality of multicast group identifiers prior to forwarding any portion of another information segment having the first multicast group identifier.

22. The input-buffered switch of claim 21, wherein each controller inserts a terminal portion of an information segment from the set of information segments after a time-out period for the connected input port when an originally transmitted terminal portion of the information segment has been identified as not received.

23. The input-buffered switch of claim 21, wherein each controller resolves contention in forwarding a first information segment from the set of information segments buffered at the input port to an output port from the plurality of output ports and in forwarding a second information segment from the set of information segments buffered at a second input port from the plurality of input ports to the output port.

24. The input-buffered switch of claim 23, wherein each controller resolves contention by a numerical round robin selection of the input ports.

25. The input-buffered switch of claim 23, wherein each controller resolves contention by a random selection of the input ports.

26. The input-buffered switch of claim 20, wherein the communication network operates in accordance with a networking protocol known as Asynchronous Transfer Mode ("ATM") and wherein the information segments from the set of information segments are established as packets and the information segment portions are packet cells, as defined by the ATM protocol.

27. A method for multipoint-to-multipoint multicast routing of information packets at a switching node having a buffer associated with each output port, said method comprising:
 performing, at an output port buffer to which a set of information packets having a plurality of multicast group identifiers are routed, the following:
  (a) establishing at least two queues at the output port buffer, each queue corresponding to an individual multicast group identifier from the plurality of multicast group identifiers, each information packet having a plurality of cells including a terminal cell, each cell having a multicast group identifier from the plurality of multicast group identifiers; and
  (b) buffering each cell from the set of information packets in the queue corresponding to the multicast group identifier from the plurality of multicast group identifiers associated with that cell.

28. A method for multipoint-to-multipoint multicast routing of information packets at a switching node having a buffer associated with each output port, said method comprising:
 (a) performing, at an output port buffer to which a set of information packets having a plurality of multicast group identifiers are routed, the following:
  i) establishing at least two queues at the output port buffer each queue corresponding to an individual multicast group identifier from the plurality of multicast group identifiers, each information packet having a plurality of cells including a terminal cell, each cell having a multicast group identifier from the plurality of multicast group identifiers;
  ii) buffering each cell from the plurality of information packets in the queue corresponding to the multicast group identifier from the plurality of multicast group identifiers associated with that cell; and
 b) forwarding all portions of a first information packet from the set of information packets having a first multicast group identifier from the plurality of multicast group identifiers prior to forwarding any portion of another information packet having the first multicast group identifier; said forwarding step (c) being performed without coordination among output ports.

29. A buffered switch, comprising:
 a plurality of input ports interconnected to a plurality of output ports; and
 a plurality of buffers, each buffer being uniquely associate with one of said plurality of output ports, a set of information packets being routed to an output port buffer from the plurality of output port buffers, the set of information packets having a plurality of multicast group identifiers, each information packet having a plurality of cells including a terminal cell, each cell having a multicast group identifier from the plurality of multicast group identifiers,
 the output port buffer to which information segments having at least two multicast group identifiers are routed establishing at least two queues, each queue corresponding to an individual multicast group identifier from the plurality of multicast group identifiers.

30. A buffered switch, comprising:
 a plurality of input ports interconnected to a plurality of output ports;
 a plurality of buffers, each buffer being uniquely associated with one of said plurality of output ports, a set of information packets being routed to an output port buffer from the plurality of output port buffers, the set of information packets having a plurality of multicast group identifiers, each information packet having a plurality of cells including a terminal cell, each cell having a multicast group identifier from the plurality of multicast group identifiers,
 the output port buffer to which the set of information packets having at least two multicast group identifiers are routed establishing at least two queues, each queue corresponding to an individual multicast group identifier from the plurality of multicast group identifiers; and
 a plurality of controllers, each controller being connected between one of said plurality of buffers and its associated output port, each controller forwarding all portions of a first information packet from the set of information packets having a first multicast group identifier from the plurality of multicast group identifiers prior to forwarding any portion of another information packet having the first multicast group identifier and forwarding without coordination among controllers.

31. A method for multipoint-to-multipoint multicast routing of information packets at an input-buffered switch having a buffer associated with each input port, said method comprising:
 performing, at an input port buffer to which a set of information packets having a plurality of multicast group identifiers are received, the following:
  (a) establishing at least two queues at the input port buffer, each queue corresponding to an individual multicast group identifier from the plurality of multicast group identifiers, each information packet having a plurality of cells including a terminal cell, each cell having a multicast group identifier from the plurality of multicast group identifiers; and
  (b) buffering each cell from the set of information packets in the queue corresponding to the multicast group identifier from the plurality of multicast group identifiers associated with that cell.

32. An input-buffered switch for multipoint-to-multipoint multicast routing of information packets, comprising:
 a plurality of input ports interconnected to a plurality of output ports;
 a plurality of buffers, each buffer being uniquely associated with one of said plurality of input ports, a set of information packets being received at an input port buffer from the plurality of input port buffers, the set of information packets having a plurality of multicast group identifiers, each information packet having a plurality of cells including a terminal cell, each cell having a multicast group identifier from the plurality of multicast group identifiers, the input port buffer at which the set of information packets having at least two multicast group identifiers are received establishing at least two queues, each queue corresponding to an individual multicast group identifier from the plurality of multicast group identifiers associated with the cell.

* * * * *